United States Patent [19]
Juntunen

[11] Patent Number: 5,581,027
[45] Date of Patent: Dec. 3, 1996

[54] DUAL INTEGRAL BALLAST FLOW SENSOR

[75] Inventor: Robert D. Juntunen, Minnetonka, Minn.

[73] Assignee: Honeywell Inc., Minneapolis, Minn.

[21] Appl. No.: 524,914

[22] Filed: Sep. 8, 1995

Related U.S. Application Data

[63] Continuation of Ser. No. 173,331, Dec. 23, 1993, abandoned.

[51] Int. Cl.⁶ ...................................................... G01F 1/68
[52] U.S. Cl. ...................................................... 73/204.21
[58] Field of Search ............................... 73/202, 202.5, 73/204.21, 204.22, 204.26, 198

[56]         References Cited

U.S. PATENT DOCUMENTS

| | | | |
|---|---|---|---|
| 3,216,249 | 11/1965 | Joel | 73/204.21 |
| 3,433,069 | 3/1969 | Trageser | 73/204.21 |
| 3,640,277 | 2/1972 | Adelberg | 73/861.71 X |
| 3,830,104 | 8/1974 | Gau | 73/202.5 X |
| 4,030,357 | 6/1977 | Wemyss | 73/202 |
| 4,494,405 | 1/1985 | Oosuga et al. | 73/118 |
| 4,648,270 | 3/1987 | Johnson et al. | 73/204.22 X |
| 4,839,038 | 6/1989 | McLain, II | 73/202 X |
| 5,081,866 | 1/1992 | Ochiai et al. | 73/204.21 |
| 5,161,410 | 11/1992 | Davey et al. | 73/204.22 |
| 5,220,830 | 6/1993 | Bonne | 73/204.21 |
| 5,303,584 | 4/1994 | Ogasawara et al. | 73/198 X |
| 5,332,005 | 7/1994 | Baan | 73/202 X |

FOREIGN PATENT DOCUMENTS

| | | |
|---|---|---|
| 0094497 | 11/1993 | European Pat. Off. . |
| 377743 | 9/1907 | France . |
| 3905746 | 8/1990 | Germany . |
| 58-221119 | 12/1983 | Japan . |
| 93/15373 | 9/1993 | WIPO . |

*Primary Examiner*—Richard Chilcot
*Assistant Examiner*—Elizabeth L. Dougherty
*Attorney, Agent, or Firm*—Robert B. Leonard

[57]            ABSTRACT

A flow sensor package having dual porous integral restrictors and a substantial bend between an inlet and a passage for housing the flow sensor and connecting the inlet to an outlet.

3 Claims, 2 Drawing Sheets

DUAL INTEGRAL BALLAST FLOW SENSOR

This application is a continuation of application Ser. No. 08/173,331, filed Dec. 23, 1993 now abandoned.

BACKGROUND OF THE INVENTION

The present invention is related to flow sensors and more particularly to packaging for flow sensors.

Flow sensors were used in a wide variety of applications to measure the flow of a gas through a predefined space. Flow sensors such as the Honeywell AWM1000, AWM2000, AWM3000 and AWM5000 Flow Sensors were used particularly in heating, ventilating and air conditioning (HVAC) applications where air flows through a duct were to be measured. The sensor produced an electrical signal representative of the air flow passing by the sensor. Such a signal was then used by a controller (not shown) to determine how best to control air flow through the duct in order to maintain air flow in a controlled space at a desired temperature.

Such flow sensors were located within a package not directly in the flow of the air. The flow to be sensed was directed past the sensor through the use of hoses or tubes. As shown in FIG. 1, one prior art package 10 included inlet 15A outlet 15B restrictor 20 hose 25 and wire lead 30. A sensor 35 was located within the package in an flow channel (not shown) which existed between the inlet 15A and the outlet 15B. Note that the flow included an axis of flow which was co-linear with the axis of flow for the inlet and the outlet. The sensor was electrically connected to wire lead 30 to provide an electrical output in proportion to the flow across the sensor. The restrictor was typically placed in series with the sensor to scale the flow across the sensing device. A less well known purpose was that this restrictor created a low pass filter effect by means of the restriction in combination with the passage way connecting inlet 15A with outlet 15B. The package shown in FIG. 1, will experience errors when subjected to fluctuations in the pressure at the outlet tube 25, in that the filtering effect of restrictor 20 was minimized.

To avoid this problem, the package of FIG. 2 was designed. Note that FIG. 2 depicts a package that was essentially the same as FIG. 1 except that there were no integral restrictors 20 in the package of FIG. 2. Also, external restrictors 40A and 40B and inlet hose 25A are included in this design. This design provides a workable solution around the problem of transitory pressures at the outlet tube. The second restrictor also adds an additional effect to the fluid dynamic properties of a sensing chamber for fluctuations at the low pressure side (the outlet side) of the center. Significant signal to noise improvements have been noted using the dual restrictor design. However, the external restrictors, tubing and labor associated with assembly added substantial additional cost.

Accordingly, it is an object of the present invention to provide an flow sensing package having the benefits associated with the design of FIG. 2 but at a substantially reduced price. It is a further object of the present invention to provide a flow sensor package which reduces the likelihood of damage occurring to the sensor.

SUMMARY OF THE INVENTION

The present invention is an flow sensor package having dual, integrated restrictors.

The package includes a body, an inlet, an outlet, a passage connecting the inlet and outlet and a restrictor each in the inlet and outlet for controlling flow there through. The restrictor is formed from a porous material which allows substantial flow there through.

The inlet and the passage are formed at a substantial angle to each other to cause the flow to make a substantial change in direction during flow through the package. This in combination with the porous restrictor, substantially protects the sensor from damage. Further benefits of the invention will be described with reference to the preferred embodiment described below.

DESCRIPTION OF THE PREFERRED EMBODIMENT

Figure 3:
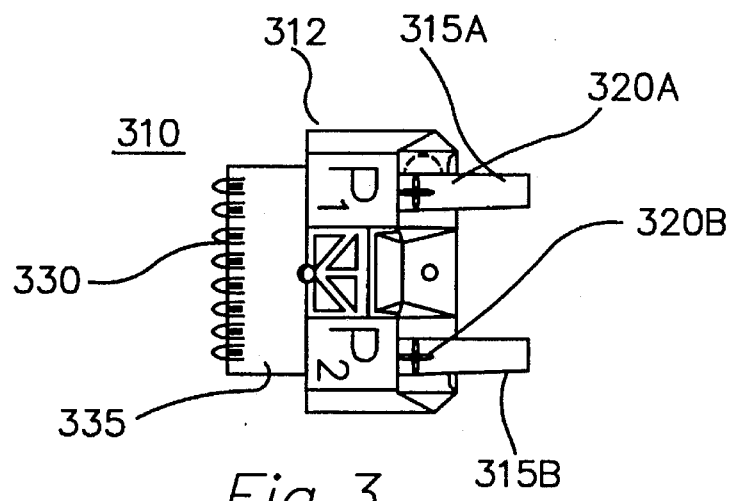
FIG. 3 is a plan view of the presently inventive package.

Referring now to FIG. 3, there shown is a plan view of the inventive device 310. The inventive device includes a body 312 having an inlet 315A and outlet 315B an passage 318 connecting the inlet and outlet inlet restrictor 320A outlet restrictor 320B and electrical connectors 330.

The body, in a preferred embodiment, may be formed using an injection molding process of a material such as Ultem, per MS 037-118. inlet 315A and outlet 315B comprise walls having passages there through to allow the flow of Located within the walls of inlet and outlet 315A and 315B are flow restrictors 320A, 320B. The restrictors may be for example, a solid wall with a hole formed therein, or a porous material. In the preferred embodiment, a porous material having multiple passages for is preferred. In this way, no single particle may fully restrict flow through the package.

The restrictor is manufactured using a sintered metal process (similar to the manufacturing of powdered metal gears). The non-corrosive metal in a granulated powder form is packed into a mold to form a pellet under controlled pressures. The resultant pellet is then heated t fuse the granulated powder into a porous solid structure. The porosity is a function of the granulated powder size, process pressure and process temperature. Once formed, the pellet is pressed into the plastic housing and held in place by compression.

In this embodiment, unlike the prior art, the inlet and outlet are oriented at a 90° angle to the flow across the flow sensor. The purpose for this orientation is to protect the flow sensor from damage by fast moving particles. Flow sensors such as the AWM1000 previously mentioned may be damaged if a particle hits the bridge structure of the flow sensor. By causing the flow to move through a substantial angular change in direction, the likelihood of a particle which gets passed the restrictor striking the flow sensor is reduced.

Although the mounting method of the flow sensor is not shown within the package, mounting of the flow sensor may be accomplished in many different ways. As an example, support means such as circuit board 335 may be used to mount the flow sensor to the body 312 of the package. In this arrangement, a portion of the passage 505 (see FIG. 5) is left open to allow mounting of the flow sensor within the passage. Circuit board 335 may also include electrical connections 330 which are in electrical communication with the flow sensor providing an electrical hookup from the flow sensor to the outside world. Mounting of the circuit board 335 to body 312 may be accomplished in any of a number of well known ways. One important criteria, however, is to ensure substantial sealing of passage 318 from the outside world once circuit board 335 is in place. A preferred method of sealing the passage is to use a sealing adhesive to bond the circuit board to the body.

Figure 4:
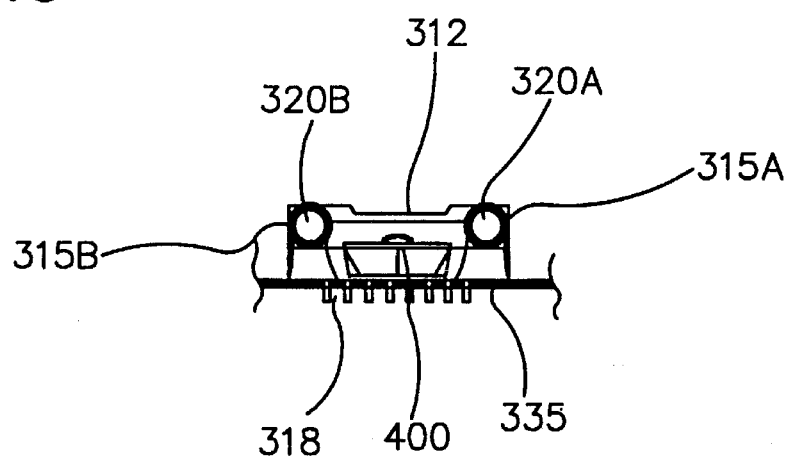
FIG. 4 is a view taken along line AA of the device of FIG. 3.

Looking now at FIG. 4, there shown is a front view of the sensor 310 as drawn along line AA. Note now the presence of flow sensor 400. It is important to note that while the present invention has been described with reference to a particular flow sensor, any flow sensor which relies upon movement of flow across the sensor may be used in this application.

Figure 2:
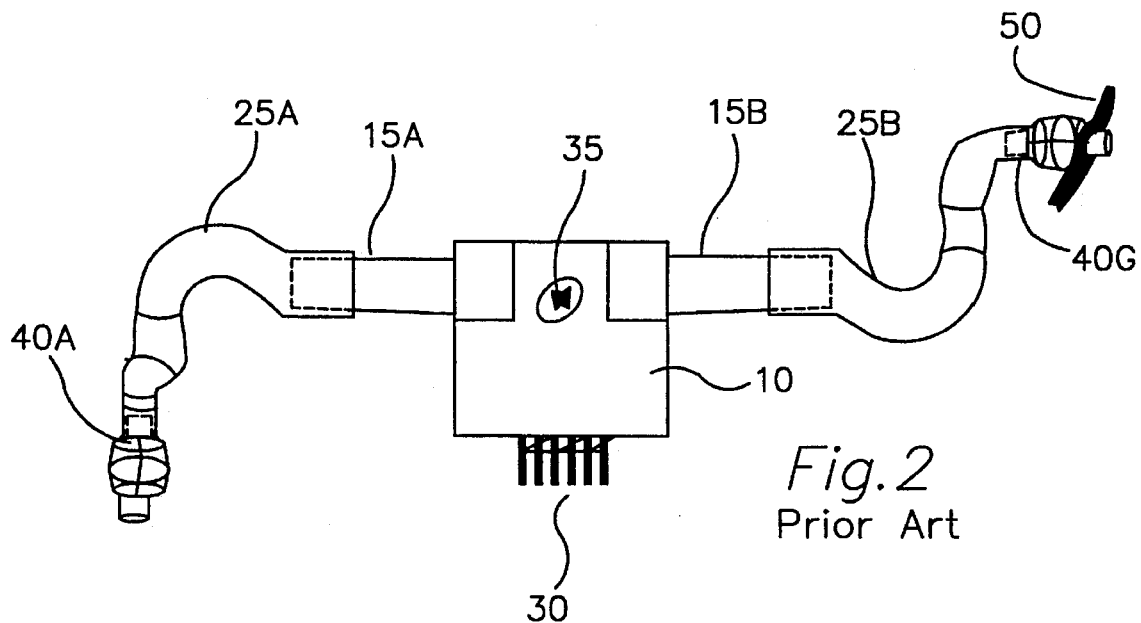
FIG. 2 is a plan view of a prior art flow sensor package including two external restrictors.
Figure 1:
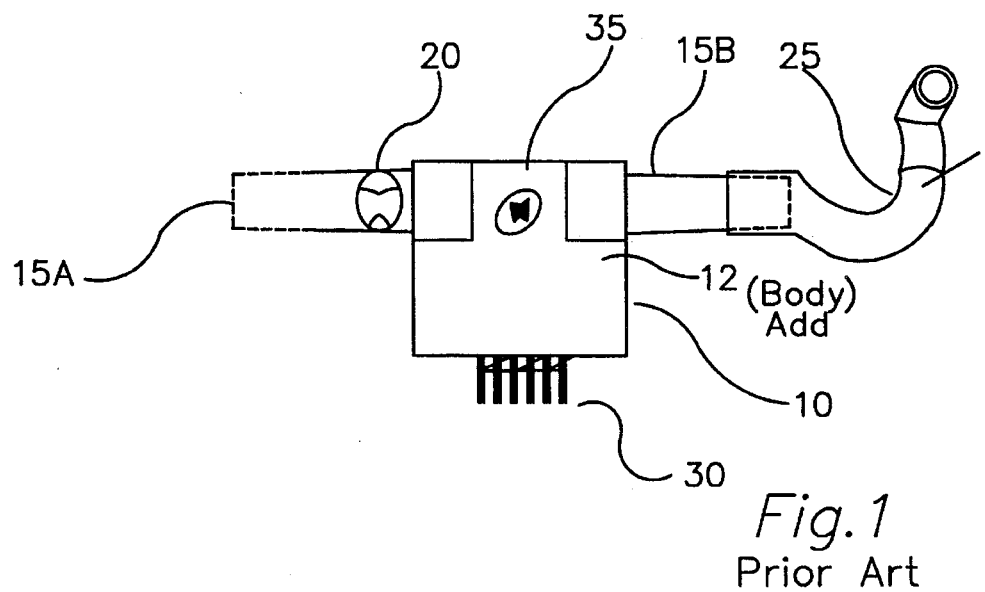
FIG. 1 is a plan view of a prior art flow sensor package.
Figure 5:
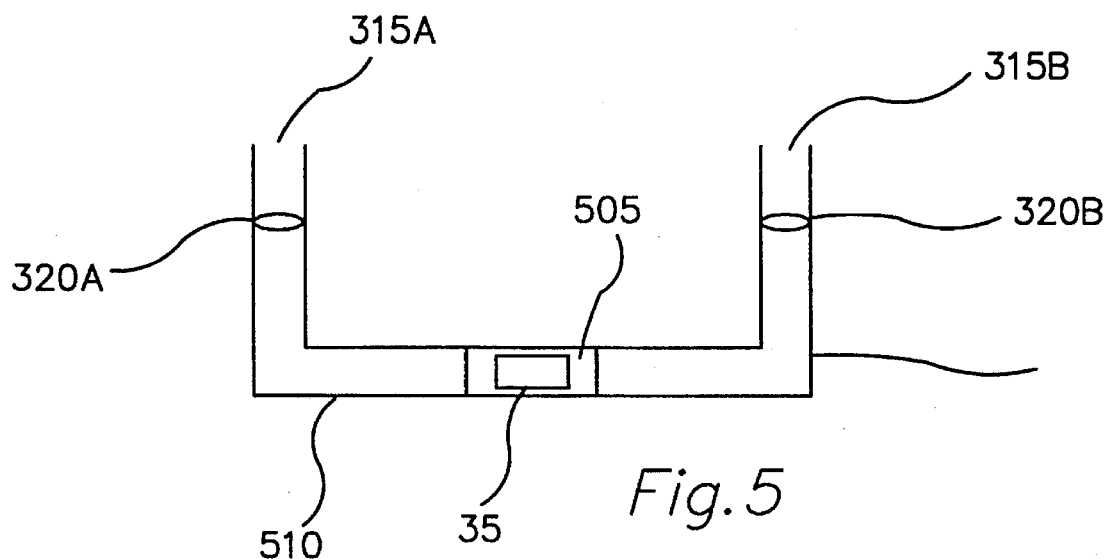
FIG. 5 is a plan view of the passage.

Referring now to FIG. 5, there shown is a plan view of the inlet, outlet and passage of the present invention. Note the placement of the restrictors 320A and 320 B within the inlet and outlet. By using two integral restrictors, a low pass filter effect is created such that superior signal to noise ratios over the single integrated restrictor design of prior art FIG. 1 are achieved. Further, the use of two restrictors in the inlet and outlet at the locations shown as opposed to the location 510 of the inlet restrictor used by the device of FIG. 1 creates a desired filtering effect. The filtering effect is dependent upon the volume of the space between the two restrictors. Lastly, the use of the sintered metal restrictors in combination with a substantial bend from the inlet to the passage to the outlet provides benefits over the dual external restrictor design in that an improved restrictor less susceptible to clogging can be used while still providing a backup method of protecting the sensor.

The foregoing has been the description of a novel package for a flow sensor. The applicant has described the inventive package in some detail, the applicant intends to protect through this patent application the invention as claimed in the following claims.

I claim:

1. A package for a sensor for sensing a flow of a gas, comprising:

a body having an inlet port, an outlet port and a passage in operational communication with said inlet and outlet, said inlet having an axis of flow substantially different to an axis of flow through said passage;

support means for supporting the flow sensor within said passage; said support means further sealing said passage such that said gas may only enter said passage through said inlet port and exit through said outlet port, said support means also establishing a space between said ports and said sensor, the space volume is adjusted to provide between the plugs an air volume for the sensor such that a low pass filter effect is established such that high frequency changes in the air flow are removed as noise from the sensor output; and first and second flow restrictors located one in the inlet port and one in the outlet port and comprising substantially identical plugs with an inlet side and an outlet side and each being formed of material having substantially no linear but numerous convoluted through-passages therein which allow the fluid of interest to pass therethrough from said inlet to outlet side of each said plug.

2. The apparatus of claim 1, wherein:

said axis of flow of said inlet is substantially perpendicular to said axis of flow through said passage.

3. The apparatus as set forth in claim 1 wherein the plugs are formed of sintered metal.

\* \* \* \* \*